INVENTOR
LEE H. HOLTHAUSEN

INVENTOR
LEE H. HOLTHAUSEN

United States Patent Office 3,428,250
Patented Feb. 18, 1969

3,428,250
FURNACE CONTROL SYSTEM
Lee H. Holthausen, San Jose, Calif., assignor to General Electric Company, a corporation of New York
Filed May 23, 1967, Ser. No. 640,546
U.S. Cl. 236—15                     9 Claims
Int. Cl. H05b 1/02; H03k 3/53; G05d 23/00

ABSTRACT OF THE DISCLOSURE

A furnace temperature control system responsive to a second diverse furnace condition. Means sense deviation of the second condition from a preselected condition to control energization of a proportional pulse controller. The proportional pulse controller, connected to a temperature set point programmer, modifies the temperature program during adverse deviation periods of the second condition.

Background of the invention

This invention generally relates to electrical control systems and more particularly to furnace control systems.

Establishing a temperature program which is in part dependent upon a diverse condition in a furnace can be quite complicated. Examples of such programs are temperature programs in vacuum furnaces or in furnaces where humidity limits must be maintained. In these furnaces, obtaining the shortest heating cycle is paramount so that maximum production is attained. However, load variations, evacuation rate changes with varying pressures and general furnace contamination caused, for example, by outgassing of materials, require the introduction of a considerable error factor in a given program. This error factor has usually been obtained by decreasing the heating rate to assure that the proper relationship of temperature and pressure or temperature and humidity is maintained. Therefore, there is an increase in heating time.

Seveal attempts to solve this problem have been made in the prior art. In one, for example, interlock systems sense the second condition and shut down the furnace heating system until the second condition returns to acceptable levels. Yet another approach is to determine empirically a program of heating and soaking times and then introduce this program into a control system. In still another purely analog approach, a desired set point program is constantly modified by a signal representing a condition. Therefore, the system is responsive to transients of the second condition; in certain applications such responses are not desirable.

It is an object of this invention to provide a furnace control system wherein heating cycle times are minimized.

Another object of this invention is to provide a furnace control system wherein the rate of temperature increase is a function of an optimum temperature program and a diverse condition within the furnace.

Still another object of this invention is to provide a furnace control system which is relatively insensitive to second condition transients.

Yet another object of this invention is to provide a furnace controller which automatically controls temperature increases as a function of pressure in a vacuum furnace.

Summary

In one embodiment of this invention, furnace temperature is controlled in accordance with a preselected optimum temperature program. An optimum temperature program is defined herein as a program which is determined without reference to any other condition; for example, in a vacuum furnace it would be assumed that the evacuation pumps had infinite capacity. A second process condition is also sensed and compared with a preselected or desired condition thereof. Any resulting adverse deviation of the second process condition from its preselected value causes the optimum temperature program to be modified so that the second condition returns to its preselected value.

Brief description of the drawings

The invention has been clearly recited in the appended claims. A better understanding of the above objects and further advantages of this invention may be had by referring to the following description taken in conjunction with the accompanying drawings wherein:

Description of the preferred embodiments

Figure 1:
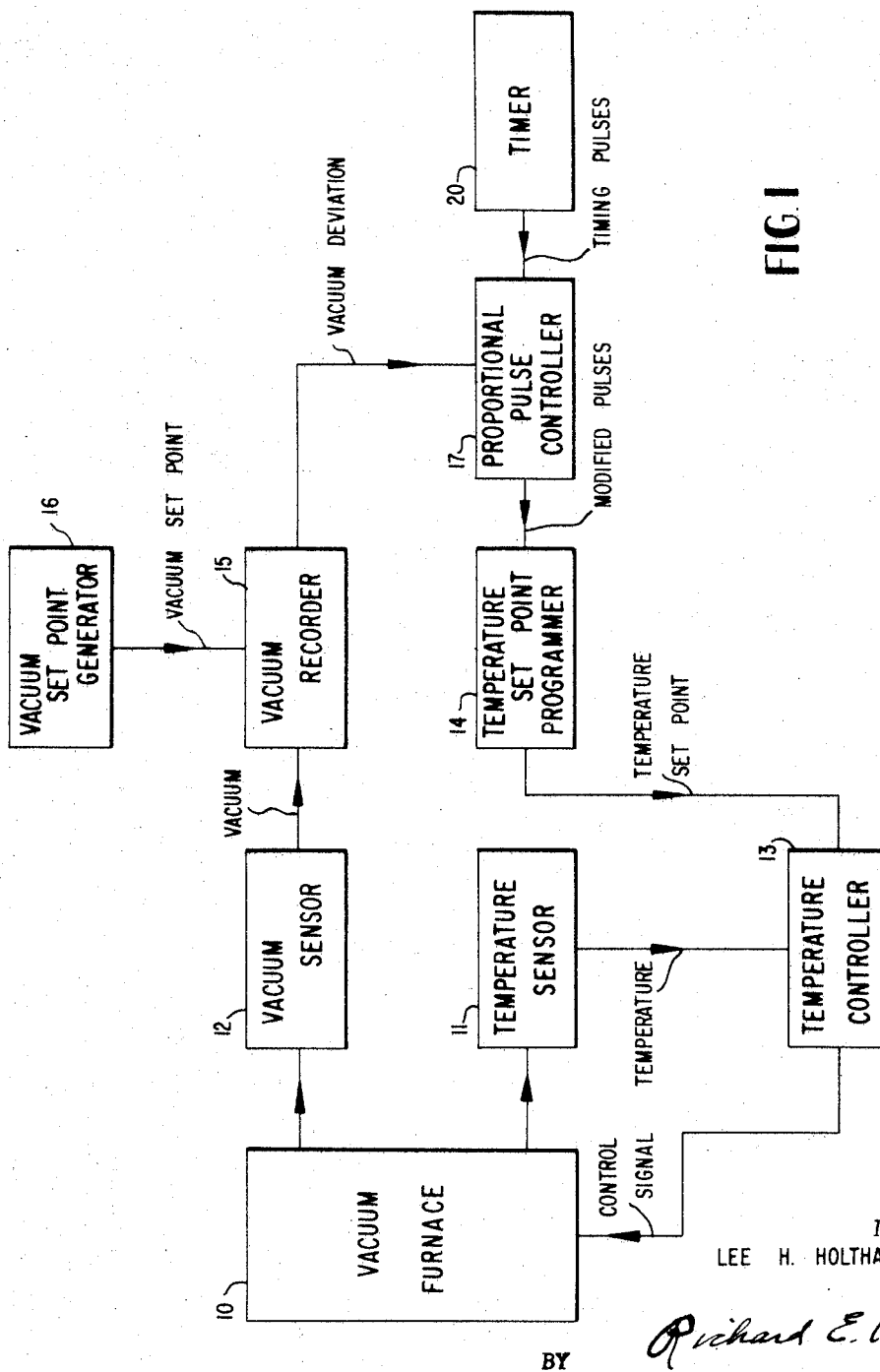
FIGURE 1 presents an information flow diagram of a circuit formed in accordance with this invention.

Referring to FIGURE 1, a furnace 10 is monitored by a temperature sensor 11 and a sensor for monitoring the condition of a second condition in the process, such as a vacuum sensor 12. It will be obvious that other condition-responsive sensors, such as humidity sensors, can be substituted for the vacuum sensor. For clarity, the remaining discussion is directed to a vacuum furnace wherein it is mandatory that pressure be maintained below a certain preselected minimal value.

The temperature sensor 11 provides one input signal to a temperature controller 13 representing the process variable. Such controllers are well known in the art and may include a recording element for recording both the actual condition of the furnace and a desired condition of the furnace, commonly known as set point. Further, these controllers produce an output control signal which is a function of process vairable and set point input signals as modified by rate, reset and proportional band function generators in the controller.

To provide a temperature set point signal, a programmer 14 is connected to the temperature controller 13. This programmer 14 permits optimum rates of temperature change to be obtained automatically. Such programmers are described and claimed in Patent 3,311,303, Noyes, issued Mar. 28, 1967 and assigned to the same assignee as the present invention. For purposes of this description, it is sufficient to state that the programmer 14 generates an electrical set point signal which varies at a predetermined rate when it is energized.

The vacuum sensor output signal is coupled to a vacuum recorder 15 where it is compared with a vacuum set point supplied by a set point generator 16. Any resultant deviation signal is then coupled to a proportional pulse controller 17 which controls the energization of the programmer 14 by a timer 20 in a manner to be described hereinafter.

Figure 2:
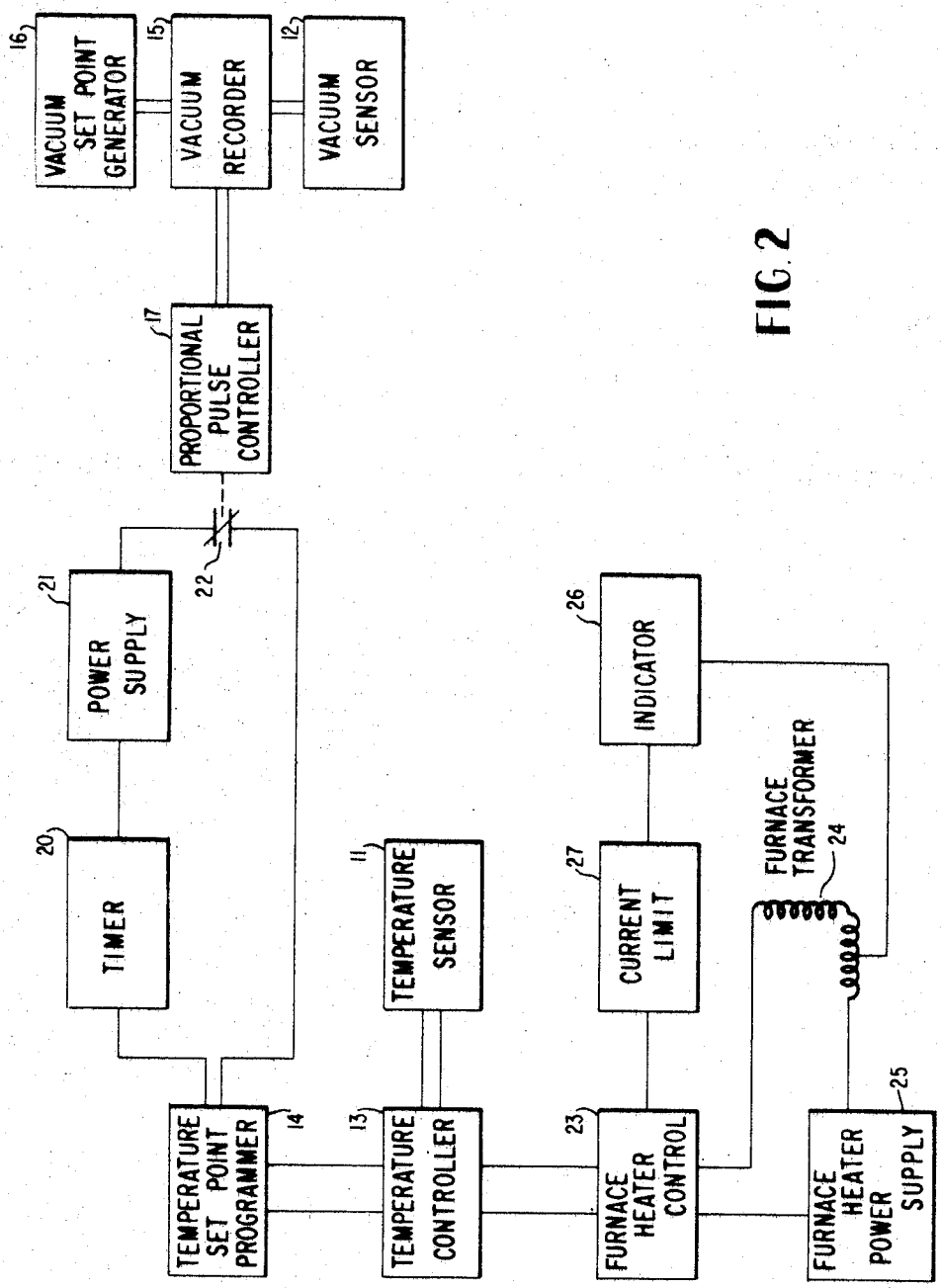
FIGURE 2 presents a block diagram of a system formed in accordance with this invention.

FIGURE 2 presents one arrangement in which the functions presented in FIGURE 1 can be accomplished. The temperature sensor 11 is connected to the temperature controller 13. Another input to the temperature controller 13 comes from the programmer 14. The programmer 14 is controlled, or activated, by time pulses from the timer 20 and a power supply 21. When the proportional pulse controller 17 receives an input from the vacuum recorder 15, conductivity of pulses to the programmer 14 is interrupted. As the programmer 14, the timer 20, the power supply 21, and contacts 22, normally closed in the absence of certain deviation signals, are in series, the programmer 14 stops advancing when the contacts 22 are opened.

Opening the contacts 22 blocks pulses from the timer 20 to the programmer 14 for time periods which increase as the vacuum deviation increases. This reduces the programmer advance and the temperature set point ramp to the temperature controller 13. As outgassing and other contributing factors to the increased furnace pressure are partially dependent upon the heating rate, the set point ramp reduction permits evacuation means, not shown, to return the pressure levels within the furnace to acceptable values before the heating cycle continues. In this manner the process reaches the preselected temperature in a minimum time.

In this figure the output of the temperature controller 13 is coupled to a furnace heater control 23 which controls current in the furnace transformer 24 from a power supply 25 in accordance with the signal received from the temperature controller 13. An indicator circuit 26 and a current limit circuit 27 are also shown herein as providing another input to the furnace heater control 23 in a manner well known in the art.

Figure 3:
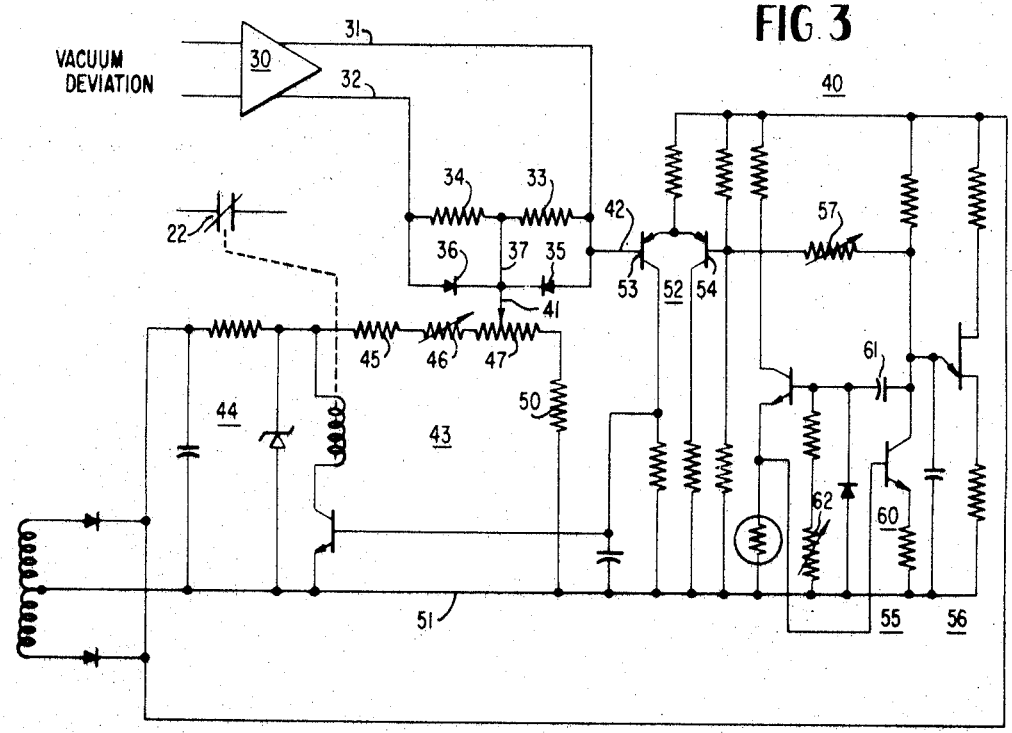
FIGURE 3 schematically presents a proportional pulse controller utilized in this invention.

Although proportional pulse controllers are well known in the art, it will be helpful to describe the operation of one proportional pulse controller in some detail. Referring to FIGURE 3, the vacuum deviation signal is applied to an operational amplifier 30 to produce a positive or negative signal across conductors 31 and 32. Resistors 33 and 34 are connected in series and to the conductors 31 and 32, respectively. A pair of diodes 35 and 36 are individually placed in parallel with each of the resistors 33 and 34 and are poled to conduct current to a center conductor 37. As will be obvious, if the vacuum deviation signal on the conductors is of such a polarity and direction as to cause the conductor 31 to be positive with respect to the conductor 32, the diode 35 conducts; and substantially all the outputs signals from the amplifier 30 appear across the resistor 34 and its parallel, reverse-biased diode 36. Similarly, if the conductor 32 goes positive with respect to the conductor 31, substantially all the output appears across the resistor 33 and the diode 35.

When the conductor 32 is positive with respect to the conductor 31, the amplified deviation signal appears across the resistor 33. This signal is applied to a time modulator circuit 40 to control the operation of the contacts 22 by conductors 41 and 42. While FIGURE 3 depicts only one time modulator circuit to sense deviation on only one side of a set point, an identical circuit can be added to sense the voltage appearing across the resistor 34 to control other relay contacts.

Conductor 41 connects one side of the resistor 33 to a variable voltage divider network 43 energized by a regulated D-C power source 44. More specifically, a dropping resistor 45, a zero set potentiometer 46, a deadband potentiometer 47, and another resistor 50 constitute a series resistive load for the power source 44. The resistor 50 is connected to a common bus 51 which is also connected to the negative terminal of the power supply 44. As the slider of the deadband potentiometer 47 is connected through the conductor 41 to the center conductor 37, the voltage between the common bus 51 and the conductor 42 is the algebraic sum of the D-C voltage across the resistor 50 and to the slider on the deadband potentiometer 47 with the oppositely poled voltage produced across the resistor 33.

This arrangement produces a desirable deadband function so that not all vacuum deviation signals modify the furnace heating rate. For example, certain transients which would modify a purely analog system may have no effect on this system. Selection of transients or deviations which will affect operation is obtained by altering the deadband potentiometer 47. However, any deviation of the vacuum conditions in the furnace will be recorded by the vacuum recorder 15 shown in FIGURES 1 and 2 and may control some other function.

The voltage appearing between the conductor 42 and the common bus 51 constitutes one input to a differential amplifier 52 and is applied to the collector and base electrodes of a PNP transistor 53. In the differential amplifier this input signal is compared with a reference signal constituted by a constant amplitude, constant frequency sawtooth wave applied to the base of another PNP transistor 54 from a sawtooth generator 55. The sawtooth generator comprises a unijunction transistor oscillator circuit 56 which is connected to the base of the transistor 54 by a span adjustment resistor 57, the span adjustment resistor 57 varying the magnitude of the sawtooth wave. The frequency of this reference signal is controlled by the output voltage from an amplifier 60 applied to the unijunction transistor emitter. This output voltage is controlled by a charging circuit including a capacitor 61 and a potentiometer 62 which is used to vary the capacitor charging time and the sawtooth wave frequency.

Therefore, the differential amplifier 52 compares the varying D-C input signal representing vacuum deviation and the constant frequency, constant amplitude sawtooth reference signal. Although choice of component values will determine the exact operations in such a circuit, it is assumed that in this circuit under normal vacuum conditions the voltage drop across the collector resistor of the transistor 53 is small. A transistor 63 and a relay coil 64 in series across the regulated supply 44 are therefore de-energized if the base of the transistor 63 is connected to the collector of the transistor 53.

Figure 4:
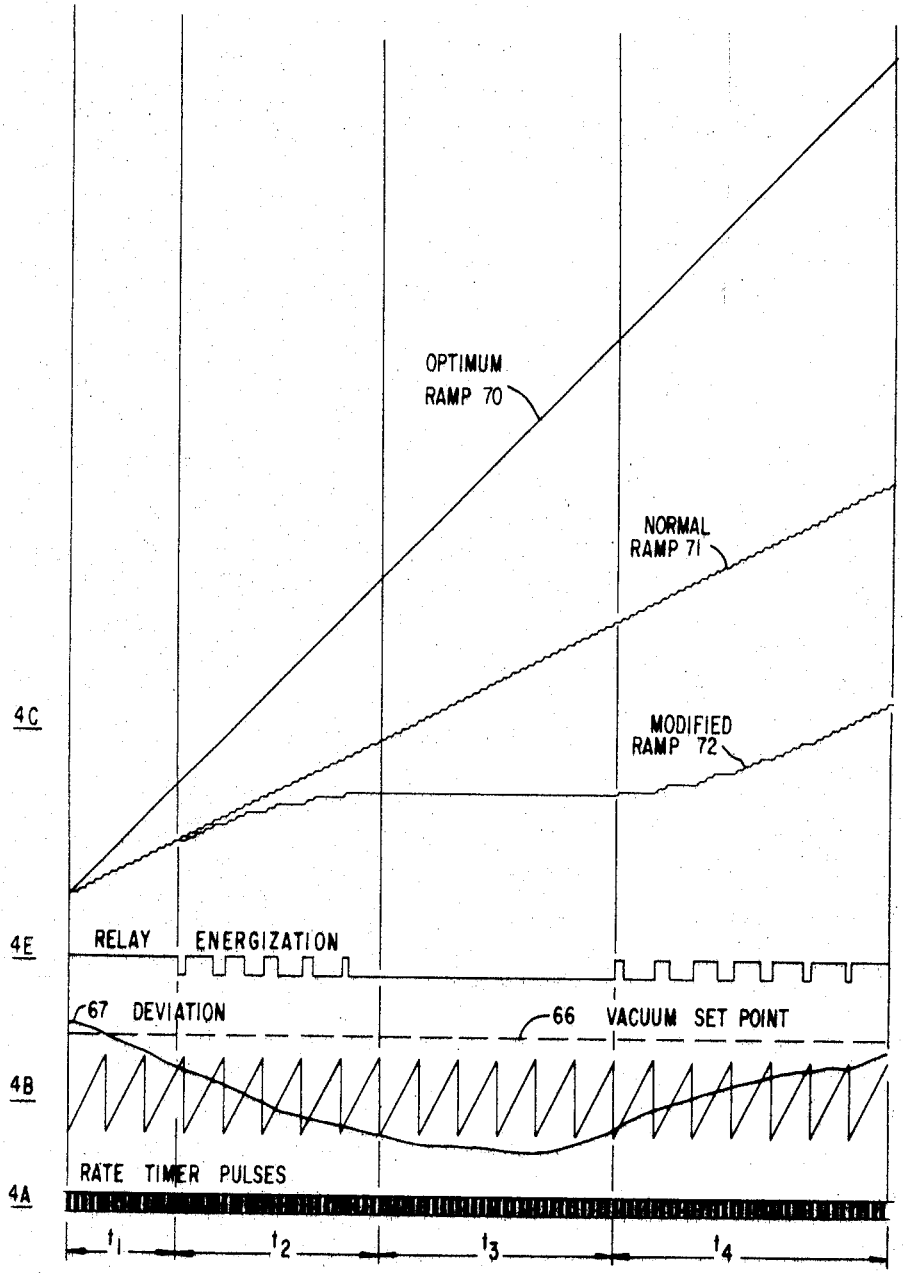
FIGURE 4 graphically illustrates how an optimum program may be modified in accordance with this invention.

FIGURE 4 illustrates the operation of a control system as shown in FIGURES 2 and 3. It is assumed for this discussion that the rate time pulses are of a constant amplitude and duration and that their frequency is greater than that of the sawtooth voltage. The rate timer pulses are depicted in FIGURE 4A; and the sawtooth voltage, appearing between the collector-base electrodes of the transistor 54 is depicted in FIGURE 4B.

Reference line 66 in FIGURE 4B represents the desired vacuum level; and curve 67, superimposed over the sawtooth wave, represents the collector-base voltage on the transistor 53. FIGURE 4C presents a graph 70 which represents a maximum set point advance by the programmer 14. As the set point advances only when the programmer is energized by the rate timer 20, the set point normally advances in a series of discrete steps as shown by curve 71 which would be set into the programmer to provide the optimum temperature program or ramp.

During the time period $t_1$, vacuum deviation does occur so that the collector-base voltage decreases; but no modification of the optimum program represented by the graph 71 occurs. Hence, the set point advances an incremental amount with each timing pulse because the relay is not energized as shown in FIGURE 4E. Further increases of furnace pressure during the period $t_2$ cause the sawtooth voltage shown in FIGURE 4B to exceed the deviation signal represented by the curve 67. When this occurs, the differential amplifier 52 energizes the relay 64 to open the contacts 22 as illustrated in FIGURE 4E. For the entire time $t_2$, the pressure steadily increases to cause the contacts 24 to be open for a proportionally longer period of each cycle time until the contacts are held open for the entire cycle during the time period $t_3$.

Curve 72 illustrates the effect of modifying the programmer set point ramp. When the contacts 22 are open, pulses from the timer 20 cannot energize the programmer 14 so the set point signal is constant. This effectively reduces the set point ramp and the furnace heating rate.

As curve 72 illustrates the effect of the control system, each of the time periods $t_1$, $t_2$, $t_3$ and $t_4$ is analyzed. During $t_1$, deviation of the vacuum level occurs; however, a deadband region has been determined so that no proportioning action occurs. At the begfinning of $t_2$, however, the deviation exceeds the predetermined deadband and steadily increases. Hence, the contacts 22 open for proportionally longer times during each sawtooth cycle, thereby blocking proportionally more of the timer pulses. This reduces the effective slope of the variable set point signal generated by the programmer 14 as represented by curve 72.

Subsequently, during $t_3$ the vacuum deviation exceeds the proportional limits of the proportional pulse controller so the contacts 22 effectively block all rate timer pulses and the temperature set point signal dwells or soaks for the entire time.

Thereafter, during the period $t_4$, the vacuum conditions improve constantly so that the deviation signal again enters a proportioning region causing the set point slope to increase until it returns to its optimum value defined by curve 71.

Figure 5:
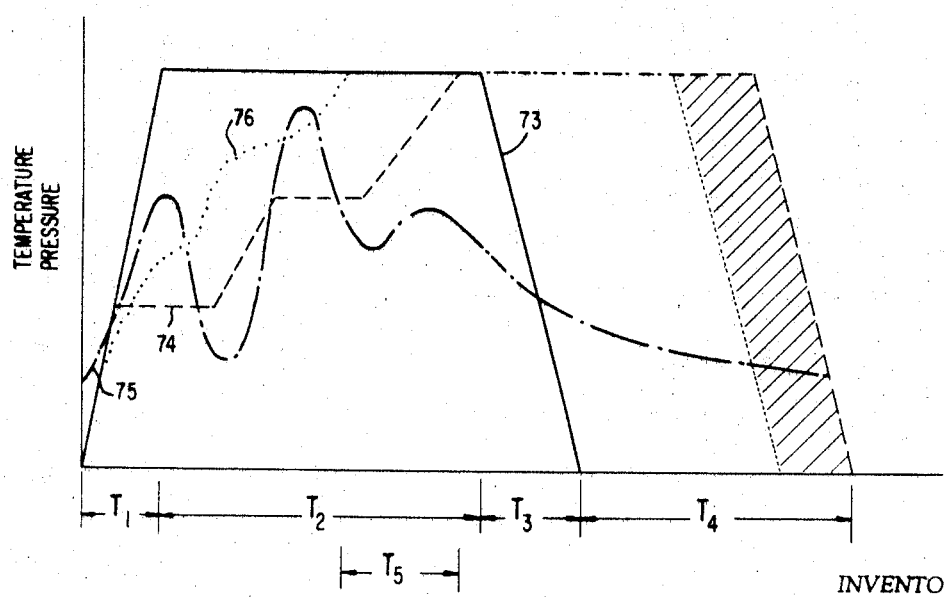
FIGURE 5 presents a theoretical analysis for operation of a system utilizing this invention and prior art systems to illustrate the benefits of the claimed system.

Although FIGURE 4 illustrates only a single ramp, FIGURE 5 illustrates how the output of such a system might compare with prior art systems for a simple, complete program which includes one heating ramp period, one soak period, and one cooling period.

Curve 73 in FIGURE 5 again represents an optimum temperature program comprising a ramp time interval $T_1$, a soak time period $T_2$, and a cooling period $T_3$. Under the prior art programs, temperature was initially raised according to the graph 74 to prevent the pressure represented by graph 75 from exceeding the allowable pressure. For example, if the pressure exceeded a predetermined value at a particular point in the program, the heating cycle was stopped, and a soak time interval occurred until the pressure was reduced below a certain level. At that time the temperature was again increased at a ramp until again the pressure exceeded a permissible value at which point another soak period was encountered until the pressure again dropped below an acceptable value. In the particular process shown in FIGURE 5, then, there were three ramp cycles and two soak cycles before the final soak cycle could occur so that the entire program took a period of time equal to $T_1$ plus $T_2$ plus $T_3$ plus $T_4$. Such a program could be empirically determined so that the ramp and soak programs were preset or a plurality of pressure sensors could be used to switch the heating means.

In accordance with this invention, however, it has been found that the temperature program could progress according to graph 76 with the same pressure requirements. Temperature increases along the optimum rate until the pressure begins to approach a critical value. Then the heating rate decreases as the proportional pulse controller begins to de-energize the programmer. It has been found that by utilizing this invention the maximum temperature can be reached at a time period $T_5$ prior to that time at which the temperature program was completed under the prior art programs. Therefore, the overall time of the process has been reduced by a factor $T_5$.

In summary, this invention contemplates furnace control by a programming means which normally provides a preselected optimum program. A second, diverse process condition is monitored and modifies the optimum program should the second process condition exceed certain limits. Therefore, it can be seen that it is necessary only to set the optimum program; requirements for interlocks or empirical data are eliminated. It will be obvious to those of ordinary skill in the art that many modifications can be made to this invention without departing from the true spirit and scope of the invention. Therefore, it is desired that the appended claims cover all such variations of control systems which utilize this invention.

What is claimed as new and desired to be secured by Letters Patent of the United States is:

1. In an automatic temperature control system for a furnace which includes heating means and means acting on a second diverse condition within the furnace which is to be maintained at a preselected value including first sensing means sensitive to the second condition, comparator means producing a second condition deviation signal when the second process condition deviates from the preselected value, furnace temperature sensing means and temperature controller means connected to the furnace and to the temperature sensing means, the improvement of means for controlling furnace temperature as a function of the second condition comprising:

(a) temperature set point programmer means connected to the temperature controller means, said programmer means producing a variable set point signal for said temperature controller at a predetermined rate;
 (b) means activating said temperature programmer means to cause the program therein to be advanced; and
 (c) proportional control switching means normally connecting said activating means to said programmer means, said switching means cyclically disconnecting said activating means and said programmer means at a substantially constant frequency when the second process condition deviates from the preselected value, the disconnect time in each cycle being variable in accordance with the deviation magnitude.

2. An automatic temperature control system as recited in claim 1 wherein said activating means comprises pulse generating means for producing pulses of a constant amplitude, duration and frequency conduction of said pulses to said programmer means being controlled by said proportional control switching means.

3. An automatic temperature control system as recited in claim 2 wherein said switching means is nonconductive for periods of time proportional to deviation of the second condition from the preselected value.

4. An automatic temperature control system as recited in claim 3 wherein said proportional control switching means has means to define a deadband region for deviations of the second process condition.

5. A vacuum furnace having heating means and evacuation means and a control system comprising:

(a) means adapted to sense vacuum conditions in the furnace;
 (b) means responsive to said vacuum sensing means for indicating deviation of the vacuum conditions from preselected acceptable conditions;
 (c) switching means operable between conductive and nonconductive states;
 (d) proportional control means responsive to a predetermined vacuum deviation for cyclically operating said switching means so the time said switching means is nonconductive during each cycle is variable in accordance with the vacuum deviation magnitude;
 (e) pulse generating means for producing timing pulses;
 (f) programmer means providing a variable temperature set point signal according to a predetermined program coupled to said pulse generating means by said switching means, said switching means modifying the rate of change of temperature set points in response to vacuum deviation;
 (g) temperature sensing means adapted to sense furnace temperature; and
 (h) controller means responsive to said temperature sensing means and said programmer means output to control the heating means in the furnace to nullify temperature deviation.

6. A vacuum furnace system as recited in claim 5, the vacuum sensing responsive means comprising a vacuum set point generator for producing a signal indicative of the preselected acceptable value and means for comparing said set point signal and said signal from said sensing means to produce a vacuum deviation signal.

7. A vacuum furnace control system as recited in claim 6, said switching means comprising a relay and energizing means for said relay, said relay having contacts in series between said pulse generating means and said programmer means controlling conduction of pulses to said programmer means, said contacts being closed when said vacuum level in the furnace is acceptable, said relay contacts being open for time periods proportional to vacuum deviation when the vacuum becomes unacceptable.

8. A vacuum furnace control system as recited in claim 7, wherein said energizing means includes means for defining a deadband region wherein said relay is conductive for certain values of vacuum deviation.

9. A vacuum furnace control system as recited in claim 8, the pulse generating means comprising means for producing pulses of a constant amplitude, duration and frequency.

References Cited

UNITED STATES PATENTS

| | | | |
|---|---|---|---|
| 2,231,695 | 2/1941 | Vedder | 13—24 X |
| 2,282,226 | 5/1942 | Hoop | 13—24 |
| 2,895,502 | 7/1959 | Roper et al. | 137—486 |
| 3,111,008 | 11/1963 | Nelson | 236—15 X |
| 3,356,784 | 12/1967 | Bertioli et al. | 13—24 |

ROBERT A. O'LEARY, *Primary Examiner.*

W. E. WAYNER, *Assistant Examiner.*

U.S. Cl. X.R.

236—46, 78; 307—228, 310; 219—496; 13—24